United States Patent
Whiting

[11] 3,829,201
[45] Aug. 13, 1974

[54] CUSHIONING MOUNT FOR A LENS IN THE RIM OF AN OPHTHALMIC MOUNTING

[75] Inventor: Harold F. Whiting, Attleboro, Mass.

[73] Assignee: The Hilsinger Corporation, Plainville, Mass.

[22] Filed: June 28, 1973

[21] Appl. No.: 374,679

[52] U.S. Cl. ............... 351/154, 350/252
[51] Int. Cl. ............ G02c 5/00, G02b 7/02
[58] Field of Search ........... 351/154, 106; 350/252, 350/245, 256, 308, 309

[56] References Cited
UNITED STATES PATENTS
2,387,789  10/1954  Williams ................ 351/154 X Primary Examiner—Paul A. Sacher
Attorney, Agent, or Firm—Barlow & Barlow

[57] ABSTRACT

The rim of an ophthalmic mounting is lined with an elastomeric member which will resiliently mount the lens and will be maintained in a substantially hidden position, the mounting cooperating with the shaping of the lens rim so as to prevent the lens from being detached by pressure at an angle to the plane of the rim.

3 Claims, 4 Drawing Figures

PATENTED AUG 13 1974  3,829,201

CUSHIONING MOUNT FOR A LENS IN THE RIM OF AN OPHTHALMIC MOUNTING

BACKGROUND OF THE INVENTION

Lens rims have heretofore been grooved along their inner circumference and something of an elastomeric nature may have been placed in the groove but the shapings of the groove and the elastomeric member have been such that security of the lens in position has been in doubt when pressure is applied on the lens at an angle to the plane of the rim. In some cases the lining for the inner circumference of the rim has been placed thereon in a liquid condition and allowed to set up in the atmosphere, as shown in U.S. specification 2,221,736. In other cases a certain solid mass has been inserted sometimes circular in cross section, as shown in French Specification 1,516,108.

SUMMARY OF THE INVENTION

The lining for a lens rim in this case is substantially of Y-shape in cross section, and the rim is provided with a deep slot usually of generally rectangular cross section with flaring walls at its edge extending to the outer surface of the rim. The lining is of a wide formation and of an elastomeric character so that when the lens is placed in the rim and the rim is closed on the lens, the arms of the lining will be placed under compression and yet the lining cannot shift with reference to the plane of the lens or thicknesswise of the rim because of the tongue of the Y cross section. Further the arms are of such a length that even when under compression and elongated they will not extend beyond the rim to present an untidy appearance.

DESCRIPTION OF THE PREFERRED EMBODIMENT

Figure 1:
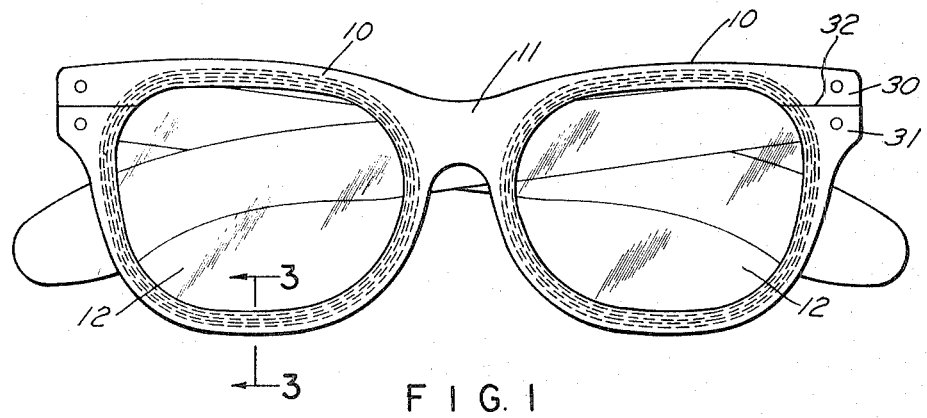
FIG. 1 is a face view of a spectacle showing rims and lenses therein.
Figure 2:
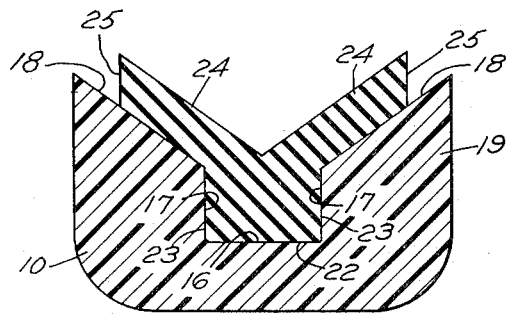
FIG. 2 is a section on line 3—3 with the lens removed.
Figure 3:
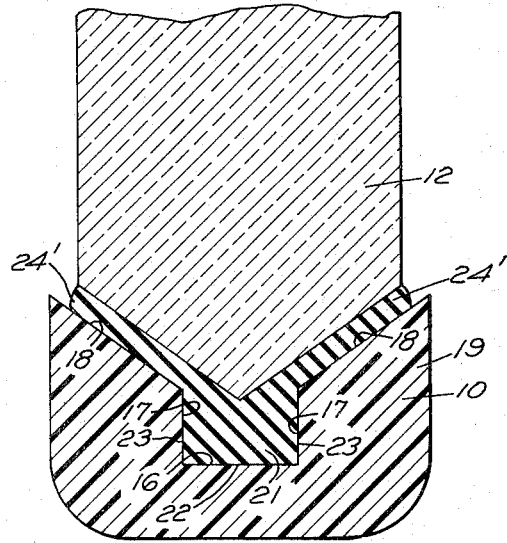
FIG. 3 is a similar section showing the edge portion of the lens in position as if clamped in the rim and showing the arms of the liner compressed and elongated.

With reference to FIG. 1 there is illustrated one possible ophthalmic mounting having a pair of rims 10, joined by a bridge 11, lenses 12 being mounted in these rims. The rim 10 in cross section as shown in FIGS. 2 and 3 has a deep groove located centrally of the rim which extends completely about its inner circumference. This groove is defined by a bottom wall 16 and side walls 17 extending at substantially right angles to the bottom wall 16, which side walls are of substantial depth. Flaring walls 18 extend from the inner ends of walls 17 to outer surface 19 of the rim 10.

Figure 4:
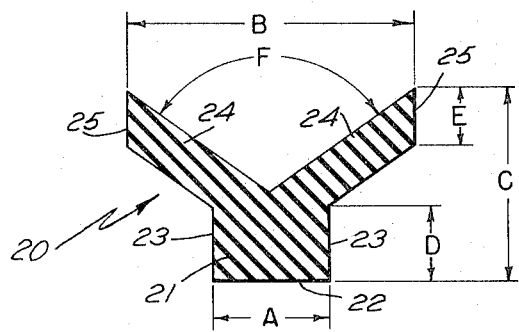
FIG. 4 is a sectional view of the liner alone and prior to being under any stress.

A liner shown by itself at 20 in FIG. 4 is generally a Y-shape in cross section having a tongue portion 21 with an end 22 and sides 23. This tongue is of substantially the thickness between its sides 23 of the dimension between the side walls 17, 17 and of a length to reach from the bottom wall 16 to the inner ends of the flaring walls 18. Arms 24 of the liner extend from the inner ends of the walls 23 at an angle substantially the same angle as the flaring wall 18 makes with the wall 17, and yet the ends 25 of these arms are terminated such that they do not reach the outer circumference 19 of the rim. The arms may have substantial thickness and they extend along and lie against the flaring wall 18 of the rim.

The rims have temporal end pieces 30 and 31 which are separable at either side of a split 32 of rim 10 so that the rim may be spread apart to receive the lens 12. The split portions are held together by suitable fasteners, known to those skilled in the art. This lens 12 is of a size a little greater than the inner circumference of the liner 20 so that when the lens is in place and the end pieces 30 and 31 are brought together they will place some pressure upon the edge of the lens and compress and elongate the liner arms 24 into the position shown at 24' in FIG. 3, thus placing the liner under stress. However, as this stress is exerted upon the liner by squeezing the split rim together the liner will maintain its centralized position because of the tongue portion 21 being in the deep groove designated 15. Thus a very secure mounting is provided for a lens such as 12 and rim such as 10.

An example of liner may have the following dimensions as shown in FIG. 4:

A 0.040
B 0.100
C 0.065
D 0.025
E 0.020
F 110°

I claim:

1. An ophthalmic mounting comprising a lens rim having a groove along its inner circumference, said groove having a mid portion generally centralized with respect to the thickness of the rim, said groove having a bottom wall, side walls at generally right angles to the bottom wall, said groove also having walls flaring outwardly from the inner ends of said side walls to the outer surface of said rim, an elastomeric liner of generally Y shape in cross section having a tongue of a thickness and shape to substantially extend from one side wall to the other side wall of said groove with arms to extend and lie along said flaring walls.

2. An ophthalmic mounting as in claim 1 wherein a lens of a size greater than the uncompressed condition of said liner is in within said rim, said rim compressing said liner about said lens and forcing said liner arms outwardly along said flaring walls which are maintained symmetrical thicknesswise of said rim by said tongue.

3. An ophthalmic mounting as in claim 1 wherein a lens of a size greater than the uncompressed condition of said liner is in within said rim, said rim compressing said liner about said lens and forcing said liner arms outwardly along said flaring walls which are maintained symmetrical thicknesswise of said rim by said tongue, said liner arms when compressed being of a length no greater than the length of said flaring walls so as to remain within the outer surface of said rim.

* * * * *